(12) United States Patent
Murphy

(10) Patent No.: US 6,369,466 B1
(45) Date of Patent: Apr. 9, 2002

(54) CANCELABLE POWER SWITCH

(75) Inventor: Stephen C. Murphy, Meridian, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 09/272,923

(22) Filed: Mar. 19, 1999

(51) Int. Cl.[7] .................................................. G06F 1/26
(52) U.S. Cl. ........................ 307/125; 307/119; 307/141; 713/300; 713/310; 116/63 R
(58) Field of Search ................................ 307/125, 139, 307/141, 142, 119; 395/750.01, 750.02, 750.03; 713/300, 310; 116/63 R

(56) References Cited

U.S. PATENT DOCUMENTS

| | | | | |
|---|---|---|---|---|
| 4,200,860 A | * | 4/1980 | Fritzinger | 116/63 R |
| 4,306,176 A | * | 12/1981 | Kaneko et al. | 315/133 |
| 5,307,050 A | * | 4/1994 | Patton et al. | 340/517 |
| 5,345,392 A | * | 9/1994 | Mito et al. | 713/300 |
| 5,568,607 A | * | 10/1996 | Ishikawa et al. | 713/300 |
| 5,638,540 A | * | 6/1997 | Aldous | 713/300 |
| 5,721,836 A | * | 2/1998 | Scharnberg et al. | 713/300 |
| 5,751,950 A | * | 5/1998 | Crisan | 395/750.02 |
| 5,784,628 A | * | 7/1998 | Reneris | 713/300 |
| 5,818,299 A | * | 10/1998 | Tran | 330/149 |
| 5,835,786 A | * | 11/1998 | Brown et al. | 713/300 |
| 5,918,059 A | * | 6/1999 | Tavallaei et al. | 395/750.01 |
| 5,918,060 A | * | 6/1999 | Jeong | 713/300 |
| 5,925,130 A | * | 7/1999 | Frame et al. | 713/300 |
| 5,925,131 A | * | 7/1999 | Novoa et al. | 713/300 |
| 6,138,241 A | * | 10/2000 | Eckel et al. | 713/300 |

* cited by examiner

Primary Examiner—Fritz Fleming
Assistant Examiner—Roberto J Rios Cuevas
(74) Attorney, Agent, or Firm—Trop, Pruner & Hu, P.C.

(57) ABSTRACT

A method to manage power to a device includes receiving a first power-off request signal, initiating a predetermined delay period, and canceling the first power-off request if a second power-off request signal is received before expiration of the predetermined delay period. If a second power-off request signal is not received before expiration of the predetermined delay period, a signal to cause the device to power down may be generated. A device to perform the method and a system including such a power control device are also described.

26 Claims, 3 Drawing Sheets

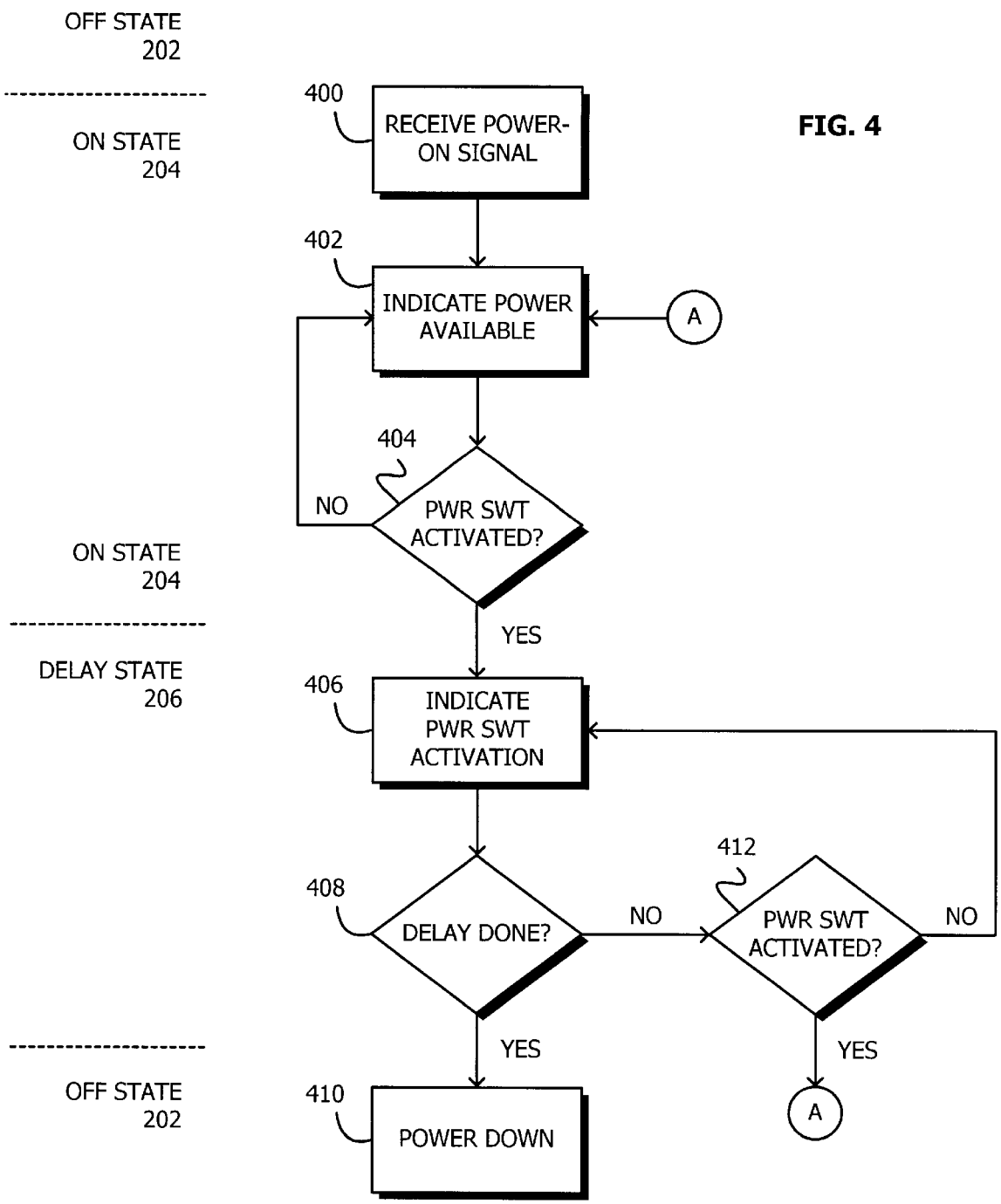

CANCELABLE POWER SWITCH

BACKGROUND

The invention relates generally to electrical system power control and, more particularly, to techniques (methods and devices) to cancel a user initiated power-off action.

Many older computer systems (e.g., personal computers and specialized workstations) employed large, stiff power switches that were typically recessed into the rear panel of the computer system's enclosure. Because of this placement, it was often difficult for a user to physically operate the power switch. In this environment, user's seldom inadvertently turned their computer system off.

Many new computer systems as well as many other types of electrical devices, however, use small momentary contact power switches located in a position easily accessible to users. For example, many current computer systems have small, easily activated power switches prominently located on the computer system's enclosure's front panel. This combination of a small and easily depressed switch makes inadvertent power down actions much more frequent. This may be particularly true for desktop units where the power switch is often on the system's front panel. Inadvertent power down operations, in turn, can lead to a loss of data (e.g., if one or more files had not been saved prior to the power down operation) or an inconvenience to the user.

Thus, it would be beneficial to provide a power control mechanism that allows a user to recover from an unwanted power-down action.

SUMMARY

In one embodiment the invention provides a method to manage power to a device. The method includes receiving a first power-off request signal, initiating a predetermined delay period, and canceling the first power-off request if a second power-off request signal is received before expiration of the predetermined delay period. In one embodiment the device is a computer processor. In another embodiment the device is a power supply relay or power supply. In yet another embodiment, the device may be a video cassette recorder.

In another embodiment, the invention provides a switch control circuit that includes a detector to detect a first activation of the switch, a delay circuit (coupled to the detector) to delay a power-off action for a predetermined period of time following detection of the first switch activation, and a cancel circuit to cancel the power-off action if the detector detects a second power switch activation during the predetermined period of time.

BRIEF DESCRIPTION OF THE DRAWINGS

FIG. 4 shows a flowchart for a power switch control method in accordance with one embodiment of the invention.

DETAILED DESCRIPTION

Techniques (including methods and devices) to cancel a power-off request are described. The following embodiments of the invention are illustrative only and are not to be considered limiting in any respect.

Figure 1:
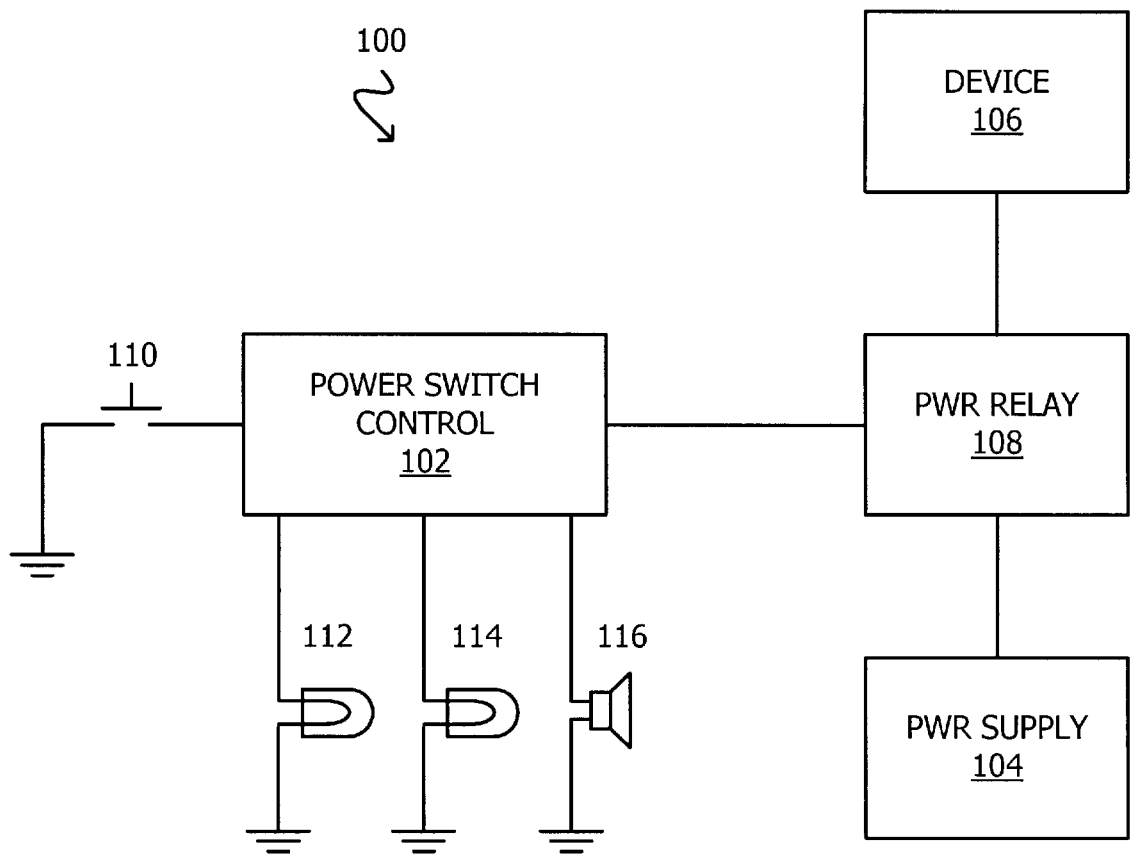
FIG. 1 shows a system having a power switch control circuit in accordance with one embodiment of the invention.

Referring to FIG. 1, system 100 having power switch control circuit 102 in accordance with one embodiment of the invention is shown. Typically, power supply 104 supplies power (voltage and current) to device 106 through power relay 108. Power relay 108 is controlled, in turn and in part, by power switch control circuit 102 which monitors power switch 110. Visual indicators 112 and 114, and audible indicator 116 may provide visual and auditory feedback to a user as to the power status of system 100 and are controlled by power switch control circuit 102. In one embodiment, device 106 may be a computer system such as a personal computer or a graphics workstation. Typical computer systems (e.g., device 106) include one or more memory modules, assorted peripheral devices, and one or more central processing units coupled via one or more bus structures. In another embodiment, device 106 may be a stereo unit, a magnetic tape recorder, or a video cassette recorder. Similarly, power supply 104 may be any source of power such as a linear or switching power supply.

Figure 2:
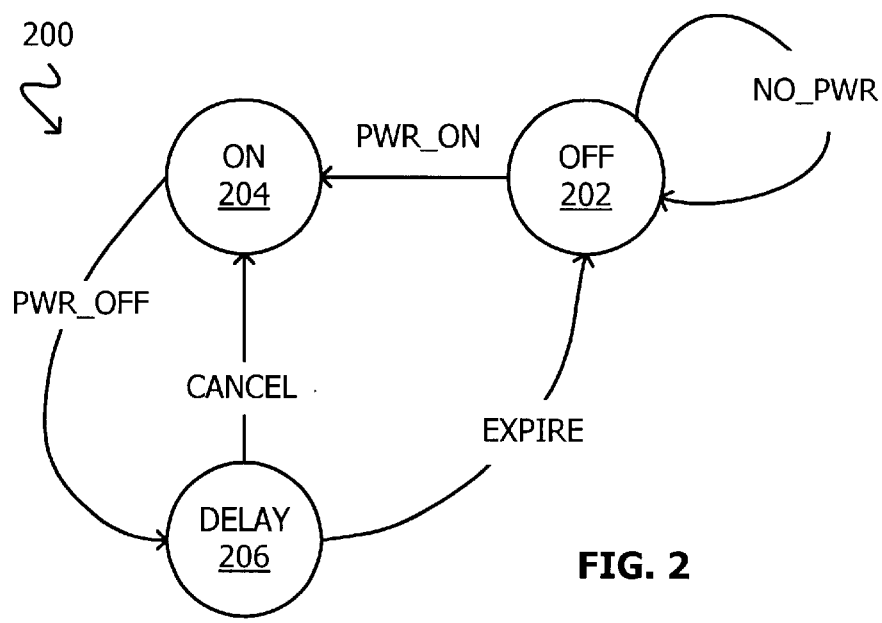
FIG. 2 shows an illustrative state diagram for the power switch control circuit of FIG. 1.

Referring to FIG. 2, state diagram 200 illustrates the operation of power switch control circuit 102 in accordance with one embodiment of the invention. As shown, control circuit 102 remains in OFF state 202 until a power-on signal (PWR_ON) is received, at which time control circuit 102 transitions to ON state 204. While in OFF state 202, device 106 and all indicators (112, 114, and 116) may be powered down. When a user activates power switch 110 (while in OFF state 202), a power-on signal is received which transitions control circuit 102 to ON state 204, activating indicator 112 (e.g., a green light emitting diode, LED).

Control circuit 102 remains in ON state 204 until a first power-off request signal (PWR_OFF) is received. A power-off request signal may be generated when a user activates power switch 110. On reception of the first power-off request signal, control circuit 102 transitions to DELAY state 206. While in DELAY state 206, control circuit 102 may activate one or more indicators to signal an impending power down operation. In one embodiment, indicator 112 may be deactivated and indicator 114 (e.g., a red LED) may be flashed at a first rate during a first portion of the specified delay period (e.g., two seconds) and flashed at a second, faster rate during a second portion of the specified delay period (e.g., one second). In addition, audible indicator 116 may emit a sound (continuous or intermittent) to indicate an impending power down action.

If the specified delay period expires before a cancel request signal (CANCEL) is received, control circuit 102 transitions to OFF state 202 which may also deactivate indicators 112, 114, and 116. The length of the specified delay period may, in some embodiments, be varied by the user through a, for example, setup application. The act of transitioning to OFF state 200 may include generating a power down signal to power relay 108, power supply 104, or device 106. If, on the other hand, a cancel request signal is received before the specified delay period expires, control circuit 102 transitions back to ON state 204, deactivating indicators 114 and 116 and reactivating indicator 112 as described above. The cancel request signal acts to terminate the power down operation requested by the first power down request signal. In one embodiment, a cancel request signal may be generated by an activation of power switch 110 during the specified delay period. Thus, power switch 110 may be used to both initiate a power down operation and to cancel that operation.

In one embodiment, state diagram 200 may be embodied in a custom designed state machine. Custom designed state machines may be implemented using a hardware device such as a printed circuit board comprising discrete logic, integrated circuits, specially designed application specific integrated circuits, or programmable gate array devices.

Figure 3:
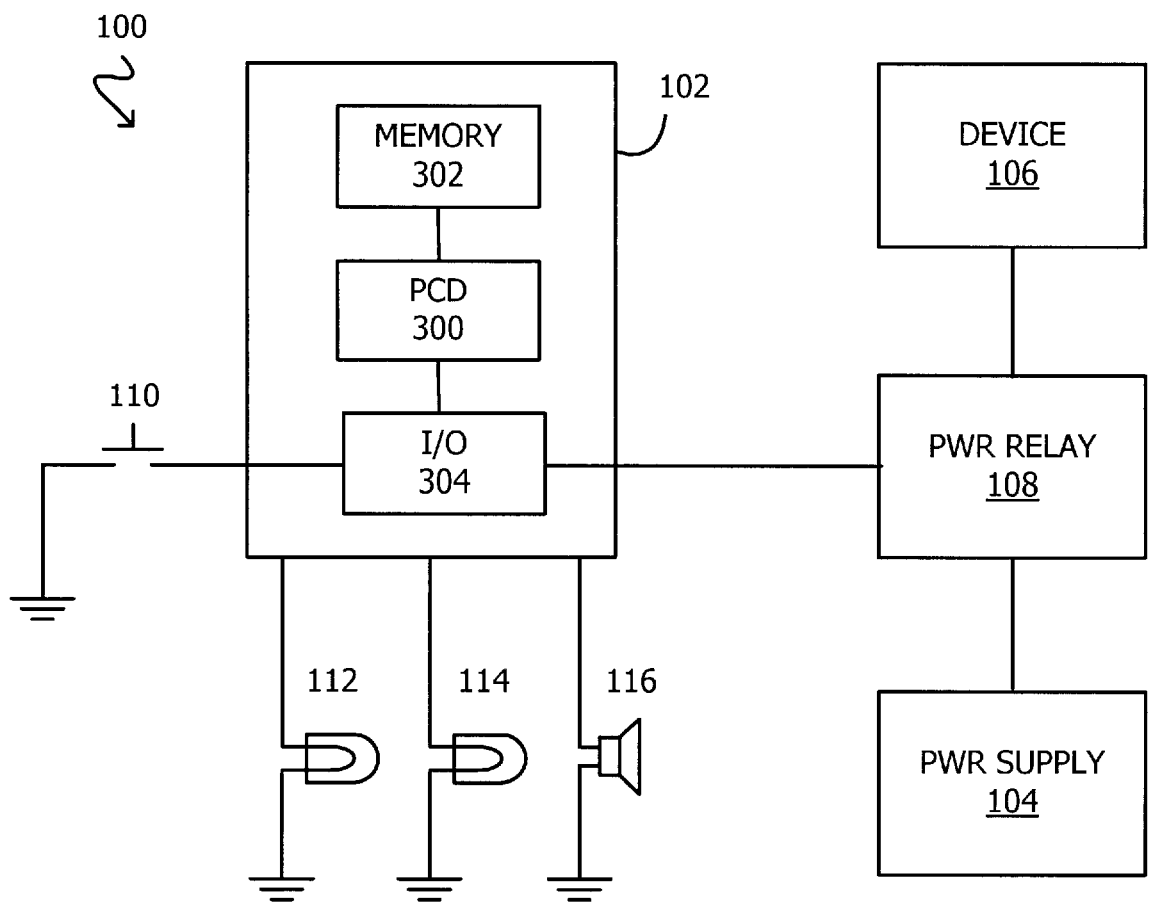
FIG. 3 shows another system having a power switch control circuit in accordance with the invention.

In another embodiment, see FIG. 3, state diagram 200 may be implemented via programmable control device (PCD) 300 adapted to execute instructions organized into one or more program modules and stored in memory 302. Illustrative programmable control devices include computer processors and microcontrollers. Illustrative memory devices include all forms of non-volatile memory including, but not limited to, semiconductor memory devices such as EPROM, EEPROM, and flash devices. Power switch 110 status and indicator control is provided by PCD 300 through input-output circuit (I/O) 304. It will be recognized that memory 302 and/or I/O circuit 304 may be incorporated within PCD 300. In yet another embodiment, a second switch may be provided (coupled to I/O circuit 304, for example) which the user may activate to cancel an inadvertent activation of power switch 110.

Referring to FIG. 4, a method to provide a cancelable power switch in accordance with one embodiment of the invention is shown. While in OFF state 202, power switch control circuit 102 may receive a power-on signal indicating a user has activated power switch 110 (block 400). Indication may then be generated to notify the user that power has been supplied to device 106 (block 402). For example, indicator 112 may be illuminated. In addition, audible indicator 116 may generate a momentary sound (e.g., a beep) to indicate power is being supplied to device 106.

Subsequent to entering ON state 204, control circuit 102 monitors the state of power switch 110. If power switch 110 is not activated (the "no" prong of diamond 404), indication of normal powered operation continues at block 402. Activation of power switch 110 while in ON state 204 generates a power-down request signal. Thus, if power switch 110 is activated (the "yes" prong of diamond 404), power switch activation is indicated (block 406) and a test is performed to determine if a predetermined amount of time has passed since the power switch was last activated (diamond 408). If a predetermined time period has elapsed since the acts corresponding to the yes prong of diamond 404 were performed (the "yes" prong of diamond 408), control circuit 102 may generate a power-down signal to power relay 108, power supply 104, or device 106 (block 410). In one embodiment, control circuit 102 may initiate a power down operation by transmitting a power down request signal to device 106—device 106 taking the necessary action to power system 100 down. In another embodiment, control circuit 102 may power system 100 down by transmitting a power down signal directly to power supply 104. In yet another embodiment, control circuit 102 may transmit a power down request signal to power relay 108—relay 108 initiating the actions (via power supply 104 or device 106) to power system 100 down.

If a predetermined time period has not elapsed since the acts corresponding to the yes prong of diamond 404 were performed (the "no" prong of diamond 408), another test is performed to determine if power switch 110 has been activated since entering DELAY state 206 (diamond 412). If a power switch activation has not occurred (the "no" prong of diamond 412), indication of the pending power down operation is continued at block 406. If a second power switch activation has occurred (the "yes" prong of diamond 412), the power down operation is canceled and control circuit 102 is returned to ON state 204.

As mentioned above, the predetermined interval may be divided into two or more subintervals. For example, during a first subinterval, visual indicator 114 and/or audible indicator 116 may be flashed and beeped at a first rate (e.g., 2 flashes and 2 beeps per second respectively). During a second subinterval the flash and/or beep rate of indicators 114 and 116 may be increased to, for example, 8 flashes and/or 8 beeps per second. In this manner, a user may be visually and audibly notified of an pending shutdown operation.

Various changes in the materials, components, circuit elements, as well as in the details of the illustrated operational method are possible without departing from the scope of the claims. For instance, if power switch control circuit 102 notifies device 106 (e.g., a host computer processor) of power switch 110 activation (i.e., a power down request), device 106 may itself display a countdown timer. Alternatively, power switch control circuit 102 may have coupled to it a display unit that could display the time remaining until control circuit 102 issues a signal to cause system 100 to be powered down. In addition, the predetermined delay period may be any convenient period such as 3 or 5 seconds.

While the invention has been disclosed with respect to a limited number of embodiments, numerous modifications and variations will be appreciated by those skilled in the art. It is intended, therefore, that the following claims cover all such modifications and variations that may fall within the true sprit and scope of the invention.

What is claimed is:

1. A method to manage power to a device, comprising:
   receiving a first power-off request signal;
   initiating a predetermined delay period based on receiving the first power-off request signal;
   canceling the first power-off request signal if a second power-off request signal is received before expiration of the predetermined delay period;
   providing an auditory indication during the predetermined delay period,
   wherein providing the auditory indication comprises providing a beeping indication; and
   defining a first subinterval and a second subinterval during the predetermined delay period, wherein providing the beeping indication comprises providing beeping at a first rate during the first subinterval and at a second, faster rate during the second subinterval.

2. The method of claim 1, further comprising generating a signal to cause the device to power down if the second power-off request signal is not received before expiration of the predetermined delay period.

3. The method of claim 2, wherein the act of generating a signal comprises generating a power-off signal to a power supply.

4. The method of claim 2, wherein the act of generating a signal comprises generating an interrupt signal to the device.

5. The method of claim 1, wherein the act of receiving the first power-off request signal comprises receiving a closed-switch indication from a switch.

6. The method of claim 5, wherein the act of receiving the second power-off request signal comprises receiving a closed-switch indication from the switch.

7. The method of claim 1, wherein the act of initiating a predetermined delay period comprises initiating a countdown timer, the count down timer having an initialized value corresponding to the predetermined delay period.

8. The method of claim 1, further comprising issuing a flashing visual indication.

9. The method of claim 1, further comprising providing a flashing indication at a first rate during the first subinterval and providing the flashing indication at a second, faster rate during the second subinterval.

10. A power switch control circuit, comprising:

a detector to detect a first activation of a power switch;

a delay circuit, coupled to the detector, to delay a power-off action for a predetermined period of time following detection of the first power switch activation;

a cancel circuit to cancel the power-off action if the detector detects a second power switch activation during the predetermined period of time; and an audible indicator to provide an auditory indication during the predetermined period following detection of the first power switch activation, wherein the predetermined period has a first subinterval and a second subinterval, and wherein the audible indicator provides a beeping indication at a first rate during the first subinterval and at a second, faster rate during the second subinterval.

11. The power switch control circuit of claim 10, further comprising a circuit to generate a power-off signal to a device following expiration of the predetermined period of time.

12. The power switch control circuit of claim 11, wherein the device comprises a computer processor and the power-off signal comprises an interrupt signal.

13. The power switch control circuit of claim 11, wherein the device comprises a power supply relay.

14. The power switch control circuit of claim 11, wherein the device comprises a power supply.

15. The power switch control circuit of claim 10, further comprising a visual indicator to indicate detection of the first activation of the power switch.

16. The power switch control circuit claim 10, further comprising a visual indicator to provide a flashing visual indication at a first rate during the first subinterval and a second rate during the second subinterval.

17. A system, comprising:

a power supply;

a device coupled to the power supply and having a power-off state and a power-on state;

a switch having a closed state and an open state;

a control circuit responsive to the closed state of the switch, the control circuit causing the device to be placed in the power-off state unless a predetermined action is detected within a specified time period of the power switch going to the closed state a first time; and an audible indicator to indicate the closed state of the switch, wherein the specified time period has a first subinterval and a second subinterval, the audible indicator to provide a beeping indication at a first rate during the first subinterval and at a second, faster rate during the second subinterval.

18. The system of claim 17, wherein the predetermined action is the switch going to the closed state.

19. The system of claim 17, wherein the device comprises a computer processor.

20. The system of claim 17, wherein the device comprises a power supply relay.

21. The system of claim 17, wherein the device comprises a power supply.

22. The system of claim 17, wherein passage of the specified time period is detected by a count down timer.

23. The system of claim 17, wherein the switch comprises a momentary contact on-off switch.

24. The system of claim 17, further comprising a central processor unit coupled to the power supply.

25. The system of claim 24, further comprising a memory module coupled to the central processing unit.

26. The system of claim 17, further comprising a visual indicator to provide a flashing indication at a first rate during the first subinterval and a second rate during the second subinterval.

* * * * *